(12) United States Patent
Stevens

(10) Patent No.: US 8,607,225 B2
(45) Date of Patent: Dec. 10, 2013

(54) MANAGED UPGRADES OF COMPONENTS IN AN INTEGRATED SOFTWARE AND HARDWARE SYSTEM

(75) Inventor: Rudd Stevens, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 13/326,118

(22) Filed: Dec. 14, 2011

(65) Prior Publication Data

US 2012/0167073 A1 Jun. 28, 2012

Related U.S. Application Data

(60) Provisional application No. 61/427,754, filed on Dec. 28, 2010.

(51) Int. Cl.
*G06F 9/445* (2006.01)
*G06F 9/44* (2006.01)

(52) U.S. Cl.
USPC .......................................... 717/175; 717/169

(58) Field of Classification Search
None
See application file for complete search history.

(56) References Cited

U.S. PATENT DOCUMENTS

| | | | |
|---|---|---|---|
| 6,895,007 B1 | 5/2005 | Teraoka | |
| 7,114,065 B2* | 9/2006 | Chu et al. | 713/1 |
| 7,114,068 B2* | 9/2006 | Chu et al. | 713/2 |
| 7,415,535 B1 | 8/2008 | Kuik et al. | |
| 8,032,776 B2* | 10/2011 | Merkin | 713/324 |
| 2005/0010715 A1* | 1/2005 | Davies et al. | 711/100 |
| 2005/0071619 A1* | 3/2005 | Chu et al. | 713/2 |
| 2005/0097310 A1* | 5/2005 | Chu et al. | 713/2 |
| 2006/0026325 A1* | 2/2006 | Huang et al. | 710/302 |
| 2006/0155837 A1* | 7/2006 | Kobayashi et al. | 709/223 |
| 2007/0050644 A1* | 3/2007 | Merkin | 713/300 |
| 2007/0100933 A1* | 5/2007 | Davies et al. | 709/203 |
| 2007/0100964 A1* | 5/2007 | Davies et al. | 709/217 |

(Continued)

FOREIGN PATENT DOCUMENTS

| | | |
|---|---|---|
| GB | 2469690 | 10/2010 |
| WO | WO 2009007619 | 1/2009 |

OTHER PUBLICATIONS

"Oracle® Communications Service Broker Netra 6000 High Availability Manager Administrator's Guide" Mar. 2012, retrieved from <http://docs.oracle.com/cd/E23521_01/doc.60/e26770.pdf>, pp. 168.*

(Continued)

*Primary Examiner* — Don Wong
*Assistant Examiner* — Marina Lee
(74) *Attorney, Agent, or Firm* — Fliesler Meyer LLP

(57) ABSTRACT

A set of managed upgrades is described for an integrated software and hardware system that functions as a communications service broker in a telecommunications (telecom) network environment. The system can be used to perform mediation and orchestration of services in the telecom network. The system includes a chassis having a plurality of enclosure slots that are adapted to contain computing blades. Each blade includes a managed server. In addition, the system includes an administration console for managing updates, installation and/or rollbacks on the computing blades. The console receives a request to update a deployment package on a managed server and sequentially distributes the deployment package to each the managed server, wherein the managed servers process the deployment package. The administration console then updates a set of metadata associated with the deployment package in a deployment packages directory.

20 Claims, 3 Drawing Sheets

(56) References Cited

U.S. PATENT DOCUMENTS

| | | | |
|---|---|---|---|
| 2007/0168476 A1* | 7/2007 | Davies et al. | 709/220 |
| 2007/0276997 A1* | 11/2007 | Luning et al. | 711/114 |
| 2008/0028107 A1 | 1/2008 | Cherian et al. | |
| 2008/0104217 A1* | 5/2008 | Srinivasa et al. | 709/223 |
| 2009/0044036 A1* | 2/2009 | Merkin | 713/340 |
| 2009/0276513 A1 | 11/2009 | Holdaway et al. | |
| 2010/0049822 A1* | 2/2010 | Davies et al. | 709/213 |
| 2010/0064169 A1* | 3/2010 | Davies et al. | 714/6 |
| 2010/0125477 A1* | 5/2010 | Mousseau et al. | 705/7 |
| 2011/0010702 A1* | 1/2011 | Vrushabendrappa et al. | 717/177 |
| 2012/0166632 A1* | 6/2012 | Jansson et al. | 709/224 |
| 2012/0166786 A1* | 6/2012 | Selitser | 713/2 |
| 2012/0167073 A1* | 6/2012 | Stevens | 717/175 |

OTHER PUBLICATIONS

International Search Report dated May 30 2012 for Application No. PCT/US2011/067389, 10 pages.

* cited by examiner

MANAGED UPGRADES OF COMPONENTS IN AN INTEGRATED SOFTWARE AND HARDWARE SYSTEM

CLAIM OF PRIORITY

The present application claims the benefit of the following U.S. Provisional Patent Application, which is incorporated by reference herein in its entirety:

U.S. Provisional Patent Application No. 61/427,754, entitled "INTEGRATED SOFTWARE AND HARDWARE SYSTEM THAT SERVES AS A COMMUNICATIONS SERVICE BROKER," by Boris Selitser et al., filed on Dec. 28, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and in particular to providing an integrated software/hardware service broker in the telecom network.

BACKGROUND

In the context of telecommunications (telecom), a mobile network operator or wireless service provider provides telephone and other services to its mobile phone subscribers. These operators typically deploy the equipment to offer these services, such as the radio transmitter network and the core network. Additionally, operators often deploy other service platforms such as voicemail, short message service (SMS) centers and many others.

As operators evolve current network infrastructure from legacy Signaling System Number 7 (SS7) to IP-based networks, they must continue to deliver and leverage legacy services to protect key revenue streams. Service providers must also continue to innovate while maintaining support for legacy Intelligent Network (IN) functionality and changing network infrastructure, developing new and compelling offerings that create strategic competitive advantage. In this context, one particular feature that has come to be desirable to many carriers is the ability to provide software and hardware upgrade support with minimal to no interruption in service.

BRIEF SUMMARY

In accordance with various embodiments, a set of managed upgrades is described for an integrated software and hardware system that functions as a communications service broker in a telecommunications (telecom) network environment. The system can be used to perform mediation and orchestration of services in the telecom network. The system includes a chassis having a plurality of enclosure slots that are adapted to contain computing blades. Each blade includes one or more managed server. In addition, the system includes an administration console for managing updates, installation and/or rollbacks on the computing blades. The console receives a request to update a deployment package on the system and sequentially distributes the deployment package to each managed server, wherein the managed servers process the deployment package. The administration console then updates a set of metadata associated with the deployment package in a deployment packages directory.

DETAILED DESCRIPTION

Figure 1:
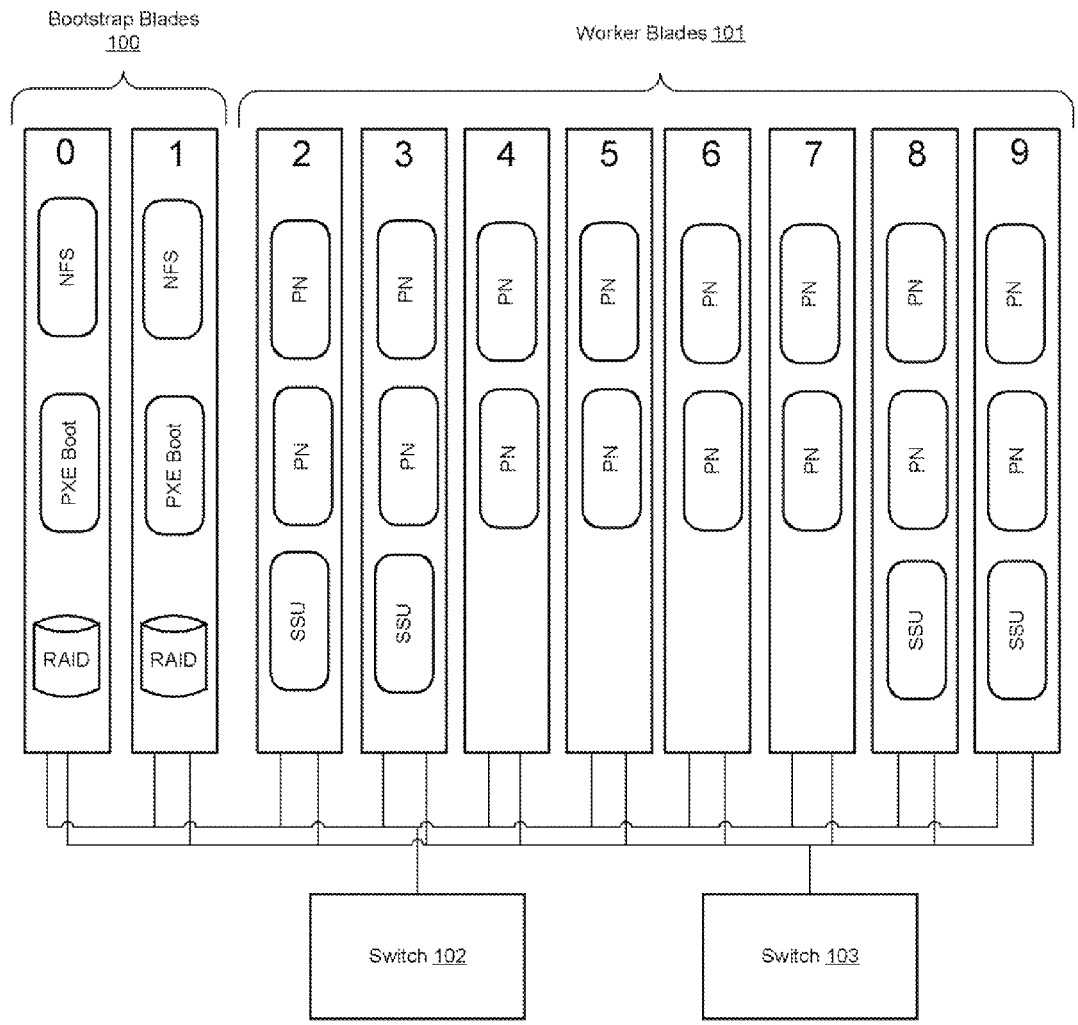
FIG. 1 is an illustration of the integrated system components as part of a single chassis, in accordance with various embodiments of the invention.

In accordance with various embodiments, an integrated software and hardware system is described that functions as a communications service broker in a telecommunications (telecom) network environment. The system can be used to perform mediation and orchestration of services in the telecom network.

In accordance with an embodiment, the service broker is engineered as a single system that is comprised of service broker software, a selection of hardware, operating system level software and the management software to integrate all of these together. In accordance with one particular embodiment, the materials of the targeted Hardware platform can include Netra N6000 chassis, a number of Netra X6270 M2 LP blades, and OPUS NEM switches. However, many other types of hardware materials are possible within the scope of the present invention.

In accordance with an embodiment, the integrated system includes a chassis with a plurality of enclosures that are adapted to contain compute blades. As used herein, the term blade denotes a computing device including a physical memory and one or more central processing units (CPU's). In accordance with an embodiment, each blade in the chassis is assigned either a worker or bootstrap role depending on the software running on it. The worker blades perform the core processing of the service broker functionality and the bootstrap blades are used to provide the bootstrapping and administration of the worker blades. In accordance with an embodiment, the worker role implies no disk storage or persistent state. Workers inherit identity and instance-specific configuration from the chassis slot that they are running in. These properties of the system allow the worker blades to be easily swapped and new worker blades to be added with little overhead management.

In accordance with an embodiment, a managed upgrade functionality can be provided for the integrated system. The managed upgrade allows the system to implement a mechanism to allow the installation, un-installation and removal of groups of OSGi bundles. Software and hardware upgrade can support minimal or no interruption in service. In accordance with an embodiment, there are two types of upgrades—operating system (OS) level upgrades and service broker (SB) level upgrades.

In accordance with an embodiment, the operating system (OS) level upgrades are performed by updating the random access memory (RAM) disk pre-boot execution environment (PXE) image and rebooting a given blade. Bootstrap blades are updated manually by removing one from service at a time.

Boot partition of the bootstrap blades is updated manually by taking each blade out of a service group. In accordance with an embodiment, the OS level upgrade is required for upgrading the OS itself, as well as any drivers or other packages installed on the OS and expected by the service broker software.

In accordance with an embodiment, the second type of upgrade is performed at the service broker (SB) level. SB level upgrades involve updates to the domain image (DI) of processes being upgraded and updating the upgraded software bundles on the live SB processes. In accordance with an embodiment, this type of upgrade can processed in two ways:

(1) SB-level online upgrade option:
   a. No impact to the services being delivered;
   b. New version of service broker software components is deployed alongside the previous version of those components.
   c. New components take over the traffic processing, while the previous version of components is retired.
   d. SB console allows driving and monitoring the upgrade process.
   e. Upgrade coordinator is exposed via JMX for integration with other consoles.

(2) SB-level offline upgrade option
   a. Safer option for upgrade of more complex SB components.
   b. Used to propagate major SB framework changes, major version releases.
   c. Complicates fail-over of services over particular protocols
   d. The domain image (DI) is updated using the SB console to reflect the upgraded state
   e. One by one SB processes are gracefully shutdown and restarted with the updated DI
   f. External Management Agents (eMAs) coordinate the upgrade process on the corresponding blades.

In accordance with an embodiment, for both options of the SB-level upgrade, the upgrade is entirely driven to completion without leaving the SB console. As part of this capability SB console allows for entering all the parameters that must be specified or changed as part of the upgrade process. In rare cases this might require an upgrade of the SB console itself. Upgrading SB console is a relatively safe and simple procedure. As noted earlier, SB console is not required for normal operation of core SB function. A silent or UI-driven installer is used to install a new version of the SB console on the serving partition hosted by bootstrap blades.

In accordance with an embodiment, any OS-level configuration and settings that must be impacted by SB software upgrade are rolled into the overall SB upgrade process. OS-level changes described here mostly apply to the worker blade OS instances. Bootstrap OS instances should change less frequently and would be updated manually. These are configuration-only changes that do not require any OS modules to be installed or loaded. Such changes are performed in two ways: First, they always result in serving partition updates to the PXE images in order to preserve them across reboots. Second, when a change must be applied at runtime, the changes are also propagated through the respective external management agents to be applied on the target environment. When reboot of the whole blade is acceptable, the first way alone is sufficient. This dictates that SB level upgrades that require such changes need to package a new PXE image version and external management agent execution instructions. SB management code keeps multiple versions SB runtime software around on the bootstrap disks in order to be able to roll back and forward between different SB component versions.

FIG. 1 is an illustration of the integrated system components as part of a single chassis, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

At the outermost layer the system is made up of one or more chassis running service broker (SB) software. The system supports scaling to multiple chassis connected by a TOR (Top of Rack) switch. In the illustrated embodiment, within each chassis there are up to 10 blades interconnected by dual redundant switches 102, 103. The switches are also used to provide redundant connections from the chassis to the TOR switches and through TOR switches to other networks on customer premises. FIG. 1 shows the key components of the system as part of a single chassis. Each blade is designated a worker or bootstrap role depending on the software that is running on it. Worker blades 101 run the SB application software and are utilized for performing the core SB function. Bootstrap blades 100 are used to provide a bootstrapping and administration function to the worker blades. Bootstrap blades run services that worker blades depend on. These services include network boot, redundant file system, and others. For high availability (HA) reasons bootstrap blades are provisioned in pairs and a single pair is sufficient to provide services to multiple SB chassis. As shown in FIG. 1, a single full chassis could have 2 bootstrap and 8 worker blades. In accordance with an embodiment, the worker role implies no disk storage or persistent state. Software running on workers relies on bootstrap blades to be available when it starts up after which point it could continue to run independently. Workers also inherit their identity and instance specific configuration from the chassis slot they are running in. These properties allow easily swapping and adding new workers with little management overhead. Bootstrap blades provide system-level functions only and do not process any SB application traffic. On average the load on the bootstrap blades should be relatively low. These characteristics should minimize chances of failure of the bootstrap blades. All the persistent state for the system is kept on the bootstrap blades where redundant access to that state is also provided. In accordance with an embodiment, bootstrap blades are not required to be online and functional for the workers to continue to operate as normal. Bootstraps should be present when a worker blade boots or worker processes restart.

In accordance with an embodiment, two types of SB processes run on the worker blades. Processing Node (PN) processes part of the Processing Tier and Signaling Server Unit (SSU) processes part of the Signaling Tier. SSU processes interface SB to external networks, don't use much memory, and are I/O intensive. The actual brokering logic and stateful protocol mediation occurs in the more memory-intensive PN processes. Also, SSU processes usually consume much less CPU than PN and fewer SSU than PN processes are required to support a given traffic volume. Roughly a ratio of 1-to-4 is used between SSU and PN processes.

Service Broker software and configuration can be bundled together into Domain Images (DI). Domain Images are groupings of .jar files containing the SB binaries and any associated configuration. PN and SSU processes are based on two separate DI's stored on the bootstrap blades. When a PN or SSU process starts up it pulls the binaries with related configuration from the corresponding DI. DI's are changed by a web-based administration console running on the bootstrap blades. These same DI's could also be updated by an external management console. External in this case refers to a console process running outside the chassis.

In accordance with one embodiment, a minimum high availability (HA) deployment consists of single chassis, 4 blades, and two switches. This configuration can provide at least dual redundant software components and redundancy for some of the hardware components. The 4 blades come out of 2 bootstrap and 2 worker instances. PN and SSU processes would be collocated on each of the worker blades and a single instance of such blade would be sufficient to maintain SB functionality. A minimum of two chassis would be required to have dual redundancy of all hardware (HW) components. Multiple chassis would be connected through external switches.

In accordance with an embodiment, bootstrap blades provide a set of services towards the worker blades. These services include operating system (OS) booting, SB software deployment, software configuration, and SB logging. In accordance with an embodiment, the bootstrap blades are also where all the persistent state of the system is saved. This allows the worker blades to be easily replaced as whatever state needs to be preserved across reboots is going to be available via the bootstraps. It can be seen that the services bootstraps provide are critical for the normal operation of the system and for being able to recover from failures. For this reason the bootstrap blades should be highly available. Bootstrap blades run in primary-secondary configuration for services that should be provided in a singleton fashion across all the bootstrap instances. Services that should be run as singletons include pre-boot execution environment (PXE) server, dynamic host configuration protocol (DHCP) server, SB logging server, SB web console, and additional infrastructure for network file system (NFS) service.

Most worker blades have similar software running on them except for the SB level profile. As noted earlier there are two main SB software profiles that a blade could have. A PN-only profile or a PN-plus-SSU profile. In addition to that, each blade has a particular identity in terms of the internet protocol (IP) addresses it has assigned on various virtual local area networks (VLANs) and other unique identifiers. Each blade inherits it's identity from the chassis enclosure slot it happens to be running in. The identity is static and is therefore associated with the slot and not with the blade. This simplifies provisioning as blades are swapped or added to empty slots. Each blade is identified by the combination of chassis and slot it resides in. Each PXE boot image consists of the OS, external Management Agent, and configuration scripts aware of a blades identity. The external Management Agent (eMA) implementation is the same on both images and it is set up to start after the OS boots. Process Instance Identity (PII)—logical identifier of a process within a blade; it is derived from the current Sys_Admin VLAN IP address and the process's fixed order relative to other processes on the blade; it is different from a PID as it remains constant between process restarts. PII exists for both PN and SSU processes. It serves as a predetermined way to refer to a SB process instance. Example use is to group process configuration specifics within a DI.

Figure 2A:
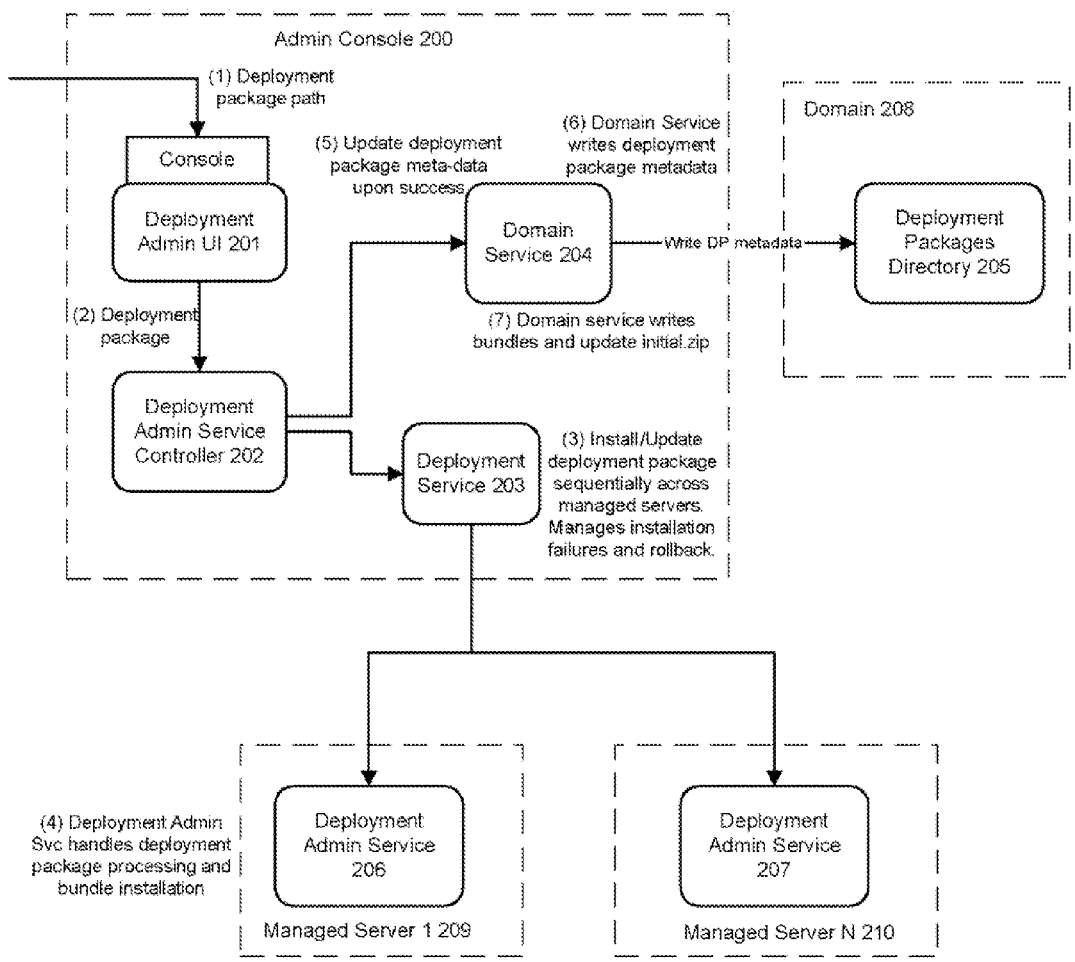
FIG. 2A is an illustration of the deployment package installation sequence during a managed upgrade, in accordance with various embodiments of the invention.

FIG. 2A is an illustration of the deployment package installation sequence during a managed upgrade, in accordance with various embodiments of the invention. As illustrated, the deployment package path is selected in the Deployment Admin user interface (UI) 201. The path is then passed to the deployment admin service controller 202. If the console/domain 200 is in "offline" mode, then the installation will be performed without managed server interaction. In accordance with an embodiment, the controller 202 can perform certain assertion checks on the deployment package to verify its integrity and correctness.

The deployment admin service controller 202 calls the deployment service 203 with the deployment package. The deployment service sequentially distributes the deployment package to the deployment admin service 206, 207 on each managed server, recording the success of each operation in turn. In the event of an exception/error from any of the managed servers 209, 210, the installation will be rolled back, and the deployment package removed from any managed servers on which it is already installed.

In accordance with an embodiment, the deployment admin service on a managed server processes the deployment package and calls the deployment service with the included bundles. This operation can follow these steps:
(1) All target bundles included in the existing (target) deployment package are stopped.
(2) Install each "source" bundle included in the new (source) deployment package.
(3) Assert the correctness of the newly installed bundles.
(4) Uninstall any stale bundles (in the case of an update).
(5) Start new/updated bundles. The start level of a source bundle will be the same as the existing target bundle. If any of the bundles fails to start, an exception will occur and the installation/update roll back sequence will be performed.

Upon successful installation on all managed servers, control returns to the deployment admin service controller 202. The deployment package metadata in the domain is updated by calling the domain service 204 to update/add the persistent deployment package metadata. The domain service then updates/adds the persistent deployment package metadata to the deployment packages directory 205 in the domain 208 and the deployment admin service controller calls the domain service to write the bundles to disk and update the initial.zip.

Figure 2B:
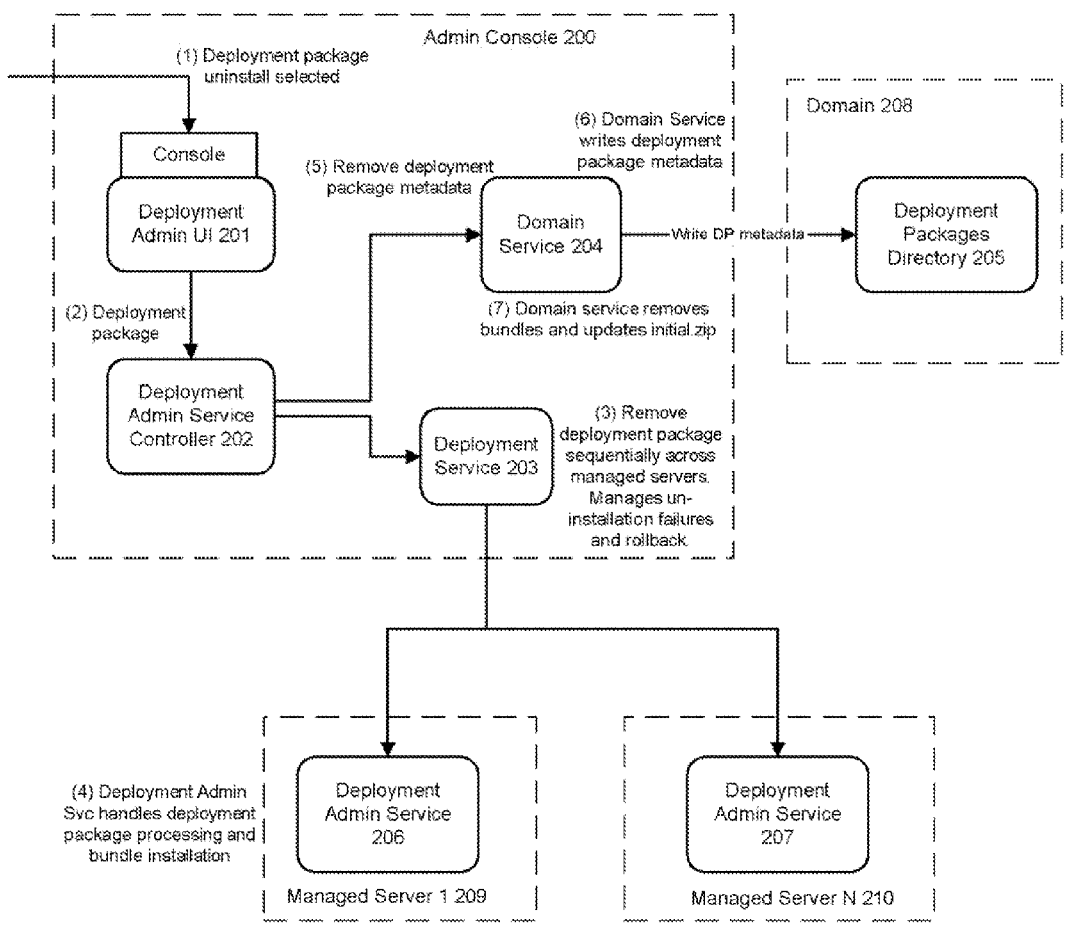
FIG. 2B is an illustration of the deployment package un-installation and roll back, in accordance with various embodiments of the invention.

FIG. 2B is an illustration of the deployment package uninstallation and roll back, in accordance with various embodiments of the invention. The deployment package to uninstall is selected in the deployment admin user interface (UI) 201. The deployment package is retrieved via the deployment admin service controller 202. The deployment package which is to be removed is then passed to the deployment service controller 202. The deployment admin service controller calls the deployment service 203 with the deployment package to remove. The deployment service 203 sequentially distributes the deployment package to the deployment admin service on each managed server, recording the success of each operation in turn. In the event of an exception/error from any of the managed servers, the removal can be rolled back and the deployment package left in place.

Continuing with the illustration, the deployment admin service on a managed server invokes the DeploymentPackage.uninstall( ) method which will invoke the deployment service to remove the target bundles. In accordance with an embodiment, this operation follows these steps:
a. All target bundles included in the existing target deployment package are stopped.
b. If any error occurs during step (a), the uninstallation will be rolled back.
c. Uninstall all owned bundles.

Upon successful uninstallation on all managed servers, control returns to the deployment admin service controller. The deployment package metadata in the domain is updated by calling the domain service to remove the persistent deployment package metadata. The domain service removes the persistent deployment package metadata from the domain directory. The deployment admin service controller then calls the domain service to remove the bundles and updates initial.zip as required.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing managed upgrades in an integrated software and hardware service broker, said method comprising:
providing an integrated system including a chassis having a plurality of enclosure slots that are adapted to contain computing blades, including a plurality of bootstrap blades and a plurality of worker blades, each blade including a managed server;
providing administration functionalities of the integrated system at the bootstrap blades;
providing service broker functionalities at the worker blades;
providing an administration console, executing on the bootstrap blades, for managing updates, installation and/or rollbacks on said worker blades;
receiving a request, on the administration console, to update a deployment package on at least one of said managed servers on the worker blades;
sequentially distributing the deployment package to each said managed server, wherein each said managed server processes the deployment package; and
updating a set of metadata associated with the deployment package in a deployment packages directory.

2. The method of claim 1, wherein each managed server further includes a deployment service that processes all included bundles in the deployment package.

3. The method of claim 1, wherein upon receiving the deployment package, the managed server stops all target bundles and installs each source bundle in the deployment package.

4. The method of claim 3, wherein the managed server asserts correctness of the bundles that were newly installed and uninstalls any stale bundles which were updated.

5. The method of claim 4, wherein the managed server starts the new bundles and updated bundles once the correctness of said bundles is asserted.

6. The method of claim 1, wherein the deployment package includes one or more Open Services Gateway Initiative (OSGi) bundles.

7. The method of claim 1, wherein the admin console further includes a deployment service that installs and updates the deployment package across all managed servers and a domain service that writes metadata associated with the deployment package to a deployment packages directory.

8. A system for providing managed upgrades in an integrated software and hardware service broker, said system comprising:
a chassis for an integrated system, having a plurality of enclosure slots that are adapted to contain computing blades, including a plurality of bootstrap blades and a plurality of worker blades, each blade including a managed server wherein administration functionalities of the integrated system are provided at the bootstrap blades, and wherein service broker functionalities are provided at the worker blades; and
an administration console, executing on the bootstrap blades, for managing updates, installation and/or rollbacks on said worker blades;
wherein the administration console receives a request to update a deployment package on at least one of said managed servers on the worker blades; and
wherein the administration console sequentially distributes the deployment package to each said managed server, wherein each said managed server processes the deployment package; and
wherein the administration console updates a set of metadata associated with the deployment package in a deployment packages directory.

9. The system of claim 8, wherein each managed server further includes a deployment service that processes all included bundles in the deployment package.

10. The system of claim 8, wherein upon receiving the deployment package, the managed server stops all target bundles and installs each source bundle in the deployment package.

11. The system of claim 10, wherein the managed server asserts correctness of the bundles that were newly installed and uninstalls any stale bundles which were updated.

12. The system of claim 11, wherein the managed server starts the new bundles and updated bundles once the correctness of said bundles is asserted.

13. The system of claim 8, wherein the deployment package includes one or more Open Services Gateway Initiative (OSGi) bundles.

14. The system of claim 8, wherein the admin console further includes a deployment service that installs and updates the deployment package across all managed servers and a domain service that writes metadata associated with the deployment package to a deployment packages directory.

15. A non-transitory computer readable storage medium storing one or more sequences of instructions executable by one or more processors to execute a set of steps comprising:
    providing an integrated system including a chassis having a plurality of enclosure slots that are adapted to contain computing blades, including a plurality of bootstrap blades and a plurality of worker blades, each blade including a managed server;
    providing administration functionalities of the integrated system at the bootstrap blades;
    providing service broker functionalities at the worker blades;
    providing an administration console, executing on the bootstrap blades, for managing updates, installation and/or rollbacks on said worker blades;
    receiving a request, on the administration console, to update a deployment package on at least one of said managed servers on the worker blades;
    sequentially distributing the deployment package to each said managed server, wherein each said managed server processes the deployment package; and
    updating a set of metadata associated with the deployment package in a deployment packages directory.

16. The non-transitory computer readable storage medium of claim 15, wherein each managed server further includes a deployment service that processes all included bundles in the deployment package.

17. The non-transitory computer readable storage medium of claim 15, wherein upon receiving the deployment package, the managed server stops all target bundles and installs each source bundle in the deployment package.

18. The non-transitory computer readable storage medium of claim 17, wherein the managed server asserts correctness of the bundles that were newly installed and uninstalls any stale bundles which were updated.

19. The non-transitory computer readable storage medium of claim 18, wherein the managed server starts the new bundles and updated bundles once the correctness of said bundles is asserted.

20. The non-transitory computer readable storage medium of claim 15, wherein the deployment package includes one or more Open Services Gateway Initiative (OSGi) bundles.

* * * * *